United States Patent
Charriere et al.

(10) Patent No.: US 6,965,007 B1
(45) Date of Patent: Nov. 15, 2005

(54) MIXED MASKED (POLY)ISOCYANATES

(75) Inventors: Eugénie Charriere, Lyons (FR); Jean-Marie Bernard, Mornant (FR)

(73) Assignee: Rhodia Chimie, Boulogne-Billancourt Cedex (FR)

( * ) Notice: Subject to any disclaimer, the term of this patent is extended or adjusted under 35 U.S.C. 154(b) by 0 days.

(21) Appl. No.: 09/744,686

(22) PCT Filed: Jul. 22, 1999

(86) PCT No.: PCT/FR99/01805

§ 371 (c)(1),
(2), (4) Date: Mar. 23, 2001

(87) PCT Pub. No.: WO00/06627

PCT Pub. Date: Feb. 10, 2000

(30) Foreign Application Priority Data

Jul. 29, 1998 (FR) .................................. 98 09718

(51) Int. Cl.$^7$ ..................... C08G 18/80; C08L 75/00; C09D 175/00

(52) U.S. Cl. ................. 528/45; 252/182.2; 252/182.21

(58) Field of Search ................... 528/45; 252/182.2, 252/182.21

(56) References Cited

U.S. PATENT DOCUMENTS

| | | | | |
|---|---|---|---|---|
| 4,096,291 A | | 6/1978 | Dunwald et al. | 427/120 |
| 5,280,100 A | | 1/1994 | Venham | 528/45 |
| 5,350,825 A | * | 9/1994 | Konig et al. | 528/45 |
| 5,510,432 A | * | 4/1996 | Schmalstieg et al. | 525/528 |
| 5,523,377 A | * | 6/1996 | Konig et al. | 528/45 |
| 5,596,064 A | * | 1/1997 | Konig et al. | 528/45 |
| 5,691,438 A | * | 11/1997 | Konig et al. | 528/45 |
| 6,005,046 A | * | 12/1999 | Kurek et al. | 524/589 |

FOREIGN PATENT DOCUMENTS

| | | |
|---|---|---|
| EP | 0 600 314 | 6/1994 |
| EP | 0 682 051 | 11/1995 |
| WO | 97-24386 | 7/1997 |

\* cited by examiner

*Primary Examiner*—Rabon Sergent
(74) *Attorney, Agent, or Firm*—Burns, Doane, Swecker & Mathis, LLP

(57) ABSTRACT

A composition of at least partially masked isocyanates. The isocyanates are masked by at least two different masking agents, selected such that in the octanol test at 110° C., the ratio: D=percentage in equivalents of masking agents unblocking first at 110° C./percentage in equivalents of masking agents unblocking last at 110° C., is greater than ⅘, advantageously greater then 1.5, preferably greater than 2. When a masking agent comprises a phenol function as a masking function, it does not comprise a COOH function.

20 Claims, No Drawings

MIXED MASKED (POLY)ISOCYANATES

The present invention relates to blocked (poly)isocyanate compounds and to their use in the manufacture of coatings.

More specifically, the present invention relates to (poly) isocyanates, some at least of the isocyanate functional groups of which are blocked or protected by at least two thermolabile protective radicals, which radicals are sometimes identified by the term "blocking" or "blocking".

A particular subject matter of the present invention is molecular compounds constituting a unit, whether mono-, oligo- or polymeric in nature, which carries isocyanate groups and which can react with appropriate coreactants, such as alcohols, phenols, amines, aminophenols or aminoalcohols, advantageously at least partially bi- or polyfunctional coreactants, which can be mono-, oligo- or polymeric in nature.

The present invention also relates to a process for producing these new blocked polyisocyanates.

It additionally targets the use of the above blocked polyisocyanates in compositions for the preparation of polymers, especially of polycondensates and of reticulates resulting from the reaction of said protected polyisocyanates and of nucleophilic coreactants. This preparation is that which is used in industrial applications, such as coatings of all types and especially those on textiles, on glasses, on papers, on metals and on construction materials, and paints.

The usefulness of blocking isocyanate functional groups (blocking sometimes denoted by blocking), indeed even the necessity thereof, is explained by an excessively high reactivity at ambient temperature of isocyanates with respect to some coreactants or with respect to a reactive solvent, or to a generally continuous support phase in the case of emulsions or suspensions, such as water. This high reactivity is often highly restricting, especially for certain applications of polyurethanes, in particular in paints, because it makes it essential to separately package, and sometimes to separately handle, the isocyanate comonomer, resulting in a use which is not very convenient.

Thus, in all the applications of polyurethanes as coatings, it is of the greatest advantage to have available blocked isocyanates, in which the isocyanate functional group is rendered unreactive at ambient temperature with respect to its coreactants but maintained reactive at a higher temperature.

These blocked isocyanate units are advantageous in several respects. In the first place, they make it possible to provide, in one and the same packaging, coating compositions (including emulsions and suspensions) in which the isocyanate component is stable and relatively insensitive to water. It follows that it is no longer necessary to use expensive anhydrous solvents which are specific to isocyanates and that it is possible to store the blocked isocyanates for a long time, without deterioration, under conditions where those which are free would deteriorate.

The use of blocked polyisocyanates also makes it possible to reduce, indeed even to eliminate, the possible toxic risk associated with the presence of free and unstable isocyanates.

The improvement in this technique for blocking isocyanate functional groups on reactive mono-, oligo- polymer units involves the optimization, in general a lowering, of the reaction temperature, that is to say that at which the deprotection is carried out, thus leading to the targeted polymerization and/or crosslinking.

More specifically, the deblocking temperature must be sufficiently high for there to be no risk of reaction during the storage period and this reaction temperature must be sufficiently low for it to be easy to carry out the polycondensation when this is desired.

In general, the "release" temperature of isocyanates, especially aliphatic isocyanates (that is to say that the carbon carrying the nitrogen has $sp^3$ hybridization), is excessively high. Which implies that the goal is a lowering of this release temperature.

Such a lowering is reflected by not insignificant economic savings in energy and in process time.

Incidentally, it should be pointed out that the blocking groups used in the case of aromatic isocyanates cannot generally be used directly for aliphatic isocyanates, the "release" temperature for the same blocking group being several tens of degrees centigrade higher than that of the aromatic isocyanates.

Many blocking radicals have already been used. Mention may be made among them of, inter alia, triazoles, imidazolines, lactams, hydroxynitrogenous compounds, sodium bisulfites, isocyanate dimers, phenols, acetoacetic acid esters and alcohols. One of the most widely used groups is the group of dialkyl ketoximes, which, however, exhibits the major disadvantage of exhibiting a release temperature which is too high for many applications.

Among these blocking agents, only those with a deblocking temperature of between approximately 80° C. (two significant figure) and 200° C. (two significant figures) are regarded as true blocking agents, in other words those which respond positively to the octanol test within the temperature range from 80° C. to 200° C.

It should be noted that the multiplicity of the parameters makes it difficult to systematize certain families.

Thus, one of the essential objectives of the present invention is to provide new polyisocyanates comprising blocked functional groups having a relatively low dissociation temperature for a limited duration and with a dissociation yield compatible with polymerization techniques.

A second objective of the invention is to provide polyisocyanates comprising blocked functional groups which are soluble in the usual solvents used for this type of application.

Another objective of the invention is to provide new polyisocyanates comprising blocked functional groups which have little or no toxicity.

Another objective of the invention is to provide novel polyisocyanates comprising blocked functional groups which are not dangerous and/or problematic to handle and to use.

Another objective of the invention is to provide new polyisocyanates comprising blocked functional groups which are economical.

Another objective of the invention is to provide new polyisocyanates comprising blocked functional groups which give access to optionally crosslinked polymers (or rather to polycondensates) which satisfy the requirements of the applications.

In reality, these objectives are somewhat contradictory.

Thus, it is known that polyisocyanates comprising blocking functional groups of (poly)nitrogenous heterocycle type, in particular triazole type, respond particularly well to the first objective of the invention but very poorly to the second because of their poor solubility in the usual solvents.

In addition, the use of these compounds is particularly advantageous because of their low cost.

Conversely, blocking groups of oxime type result in blocked polyisocyanates which exhibit good solubility in the usual solvents but which release the blocking group at higher temperatures. In addition, some free oximes are said to be toxic.

By virtue of the studies carried out by the inventors, it has been shown that some at least of these different objectives can be reconciled by blocking the polyisocyanates by means of two different blocking groups exhibiting a difference in reactivity and thus a difference in release temperature.

In particular, it has been shown that, when a composition comprising (poly)isocyanate(s) is at least partially blocked by two different blocking groups corresponding to the definition below, the overall release temperature, as measured by the octanol test explained in detail below, is that or at the very least very close to that of the group which is released in first place, that is to say the lowest temperature.

The various objectives set out above can be more advantageously reconciled when use is made of two different blocking agents exhibiting a difference in release temperature, one comprising a reactive hydrogen group —OH and the second a reactive hydrogen group —NH, respectively forming, by reaction with the NCO isocyanate functional groups, bonds of pseudourethane and urea type.

In an unpublished patent application, the Applicant Company has disclosed mixed blocked isocyanates which can be used in powder paints in which the isocyanate functional groups are blocked by at least two blocking agents, at least one of which exhibits a non-carbonaceous carboxyl functional group. In these isocyanates, however, the blocking role of the group carrying the carboxyl group is inseparable from the catalytic role.

The subject matter of the invention is thus an at least partially blocked composition comprising isocyanates, characterized in that it is blocked by at least two different blocking agents selected so that, in the octanol test at 110° C., the ratio $$D = \frac{\text{percentage in equivalents of blocking agent which deblocks first at } 110° \text{ C.}}{\text{percentage in equivalents of blocking agent which deblocks last at } 110° \text{ C.}}$$

is greater that 4/3, advantageously greater than 1.5, preferably greater than 2, with the proviso that, when a blocking agent comprises a phenol functional group as blocking functional group, it does not comprise a COOH functional group.

The deblocking percentages are measured at 110° C. according to the octanol test on the isocyanate completely blocked by a single blocking agent, that for which the measurement is carried out.

The most commonly used blocking agents are those cited by M. Wicks in his article "Blocked isocyanates", Progress in Organic Coatings (1975), Vol. 3, p. 73; their deblocking temperatures are advantageously greater than 90° C.

The blocking agents can be divided into three groups:
those for which the mobile hydrogen is carried by a chalcogen;
those for which the mobile hydrogen is carried by a nitrogen;
those for which the mobile hydrogen is carried by a carbon.

Among those for which the mobile hydrogen is carried by a chalcogen (preferably a light chalcogen, namely sulfur and oxygen), use is especially made of those where the chalcogen is an oxygen. Mention may in particular by made, among the latter, of:
products comprising an >N—OH sequence, such as, for example, oximes (=N—OH) or hydroxyimides ([—CO—]$_2$N—OH); and
phenols, in particular those for which the aromatic nucleus is depleted in electrons, such as hydroxypicolines and hydroxybenzoates (for example, EP-A-680 984 and WO 98/4608).

Mention may also be made of the compounds disclosed in application EP-A-661 278.

Mention may in particular be made, among those for which the mobile hydrogen is carried by a nitrogen, of:
monosubstituted amides and in particular lactams (the most widely used being caprolactam);
imides ([—CO—]$_2$N—H), in particular cyclic imides, such as succinimide;
unsaturated nitrogenous heterocycles, in particular with five ring members (advantageously doubly unsaturated), preferably comprising at least two hetero atoms (preferably nitrogen). Mention may be made, among the latter, of diazoles (such as glyoxalines and pyrazoles), triazoles or indeed even tetrazoles.

Mention may also be made of the compounds disclosed in application EP-A-661 278.

Mention may essentially be made, among those for which the mobile hydrogen is carried by a carbon, of compounds of malonic nature, that is to say an RCH<radical carrying two electron-withdrawing groups (such as carbonyl, nitrile, Rf or perfluoroalkyl).

Mention may therefore in particular be made of the following pairs of blocking agents: methyl amyl ketoxime/2-hydroxypyridine and dimethylpyrazole/2-hydroxypyridine.

To the knowledge of the Applicant Company, none of the pairs disclosed previously possesses either the advantages or the characteristic mentioned above. In particular, the pyrazole/triazole pair exhibits a ratio D of between 1.1 and 1.2.

A particular subject matter of the invention is an at least partially blocked composition comprising isocyanates, characterized in that it is blocked by at least two different blocking agents corresponding to the above condition, at least one of which reacts with the isocyanate functional group via an —OH group and at least another of which reacts with the isocyanate functional group via an —NH group.

Another subject matter of the invention is an at least partially blocked composition comprising isocyanates, characterized in that it is blocked by two (indeed even more) different blocking agents corresponding to the above condition which react with the isocyanate functional group via the —NH group.

Mention may in particular be made of blocking agents of pyrazole or substituted pyrazole type.

Another subject matter of the invention is an at least partially blocked composition comprising isocyanates, characterized in that it is blocked by two different blocking agents corresponding to the above condition which react with the isocyanate functional group via the —OH group.

The two blocking groups are advantageously present in a ratio (expressed in equivalents of blocking functional group) of between 10/90 and 90/10, preferably 20/80–80/20.

Among the blocking compounds with a mobile hydrogen group carried by an OH group, oximes are preferred. Mention may, in particular be made of methyl ethyl ketoxime, acetone oxime, methyl amyl ketoxime, the oxime of methyl pyruvate or the oxime of ethyl pyruvate (also denoted by "POME").

It should be remembered that oximes add to isocyanate functional groups, the hydrogen going to the nitrogen while the oxygen is grafted onto the carbon of the carbonyl, according to the scheme:

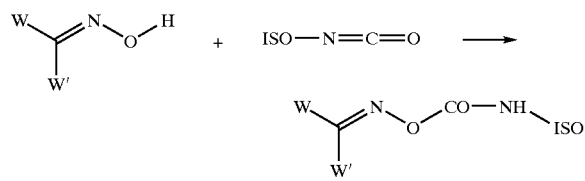

W and W', which are identical or different, representing aliphatic, alicyclic or aromatic hydrocarbonaceous or heterocyclic groups, it also being possible for W and W' together to represent a carbonaceous or heterocyclic ring. It is desirable for W and W' not to be simultaneously aromatic (that is to say that an aromatic ring is bonded directly to the carbon of the oxime functional group).

The W and W' groups can also comprise any type of substituent.

Mention may be made, as examples of substituents, of alkyl, alkenyl, alkynyl, cycloalkyl, aryl, aralkyl, alkaryl, heterocyclic, alkoxy, perhaloalkyl ($CF_3$, $CCl_3$ and the like) and polyalkoxy groups. The substituents can in particular be electron withdrawing substituents, as disclosed in patent application WO 97/24386.

All substituents are suitable with the exception of those exhibiting a greater reactivity than the OH functional group of the oxime with the isocyanate functional group of the isocyanate compound.

The alkyl, alkenyl, alkynyl and alkoxy groups generally comprise from 1 (two for the alkenyl and alkynyl groups) to ten carbon atoms, preferably from 1 (two for the alkenyl and alkynyl groups) to six carbon atoms, the aryl groups advantageously being $C_6$–$C_{18}$ aryl groups.

ISO represents the residue of the isocyanate molecule, which can comprise, as is described previously, (an) other isocyanate group(s).

Mention may in particular be made, among the blocking compounds with a mobile hydrogen carried by an >NH group, of nitrogenous heterocycles, in particular polynitrogenous heterocycles, preferably with five or six ring members, a few examples of which are composed of imidazole, pyrazole, triazoles (1,2,3-(triazole and 1,2,4-triazole), tetrazole and their substituted derivatives, triazoles being preferred.

The derivatives of these compounds carrying one or more substituents, that is to say at least one, two or three substituents, are also suitable, the substituents being as defined above for the oxime.

All the substituents are suitable, with the exception of those exhibiting a greater reactivity than the NH functional group of the nitrogenous heterocycle with the isocyanate functional group of the isocyanate compound.

These blocking groups of nitrogenous heterocycle type add to the isocyanate functional groups, the hydrogen going to the nitrogen while the nitrogen is drafted onto the carbon of the carbonyl of the isocyanate functional group, according to the scheme:

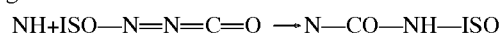

ISO being as defined above.

The preferred isocyanate compositions according to the invention are the compositions in which the blocking groups are respectively an oxime and triazole (1,2,3-triazole or 1,2,4-triazole), the oxime advantageously being methyl ethyl ketoxime, methyl amyl ketoxime, the oxime of methyl pyruvate or the oxime of ethyl pyruvate.

Surprisingly, it has been found that, when the polyisocyanate composition comprises triazole/oxime blocking groups, in particular for "true" oximes, that is to say oximes carrying two alkyl chains α to the C carrying the N—OH group, in the abovementioned ratio (at least 10% and up to 90% of triazole groups, more particularly when it comprises at least 50% of triazole groups), the release temperature for the blocking groups is always less than that of the oxime group and close to that of the triazole group.

Triazole is a blocking agent which is very difficult to use because the compounds which it gives are only soluble in very few solvents. An additional advantage of the present invention is that of providing blocked compounds, one of the blocking agents of which is triazole (one mixed blocked compounds, one of the blocking agents of which is triazole (one or the other isomer, generally a mixture of the two), which have good solubility in the usual solvents while having the same advantages as triazole.

Consequently, in order to obtain good solubility, when one of the blocking agents is triazole, it is desirable for the latter to be combined with at least one blocking agent where the mobile hydrogen is carried by an oxygen, advantageously an oxime. A triazole/all the blocking agents ratio by mass is advantageously at most equal to ⅔, preferably to 50%.

Problems of solubility are encountered when use is made, as blocking agents, of two different compounds exhibiting 5-membered nitrogenous heterocycles, in which case, in order to avoid crystallinity and thus insolubility in the solvents, it is desirable:

either to have at least ⅓ of blocking groups comprising an —OH functional group;

or to have blocking agents comprising 5-membered nitrogenous heterocycles carrying substituents, the sum in equivalents of the carbon atoms of the substituent groups with regard to the nitrogenous rings (number of carbon atoms of the substituent groups/number of 5-membered nitrogenous rings) being at least equal to 4, preferably to 6.

Generally, it is preferable for there to be not more than two blocking groups present in the composition.

However, when more than two blocking groups are present, it is preferable, in the case where the third group deblocks at a temperature in the vicinity of the deblocking temperature of the first, for the amount of blocking groups in addition to the two main groups not to exceed 30% in equivalents, advantageously not more than 25%, preferably not more than 20% and in particular not more than 15% in equivalents with respect to the sum of the blocked functional groups of the polyisocyanate composition.

As was mentioned above, the isocyanates for which the invention is most advantageous are those for which the nitrogen atom is bonded to a carbon with $sp^3$ hybridization and more particularly aliphatic isocyanates. Mention may in particular be made of polymethylene diisocyanates (for example, TMDI (TetraMethylene Diisocyanate) and HDI [Hexamethylene Diisocyanate =OCN—$(CH_2)_6$—NCO]) and their various condensation derivatives (biuret, and the like) and "trimerization" derivatives (in the field under consideration, the mixtures resulting from the formation of isocyanuric rings from three isocyanate functional groups are known as trimer; in fact, there are, in addition to the true trimer, heavier products resulting from the trimerization).

Mention may also be made of isophorone diisocyanate (IPDI), norbornane diisocyanate (NBDI), 1,3-bis(isocyanatomethyl)cyclohexane (BIC), $H_{12}$-MDI and cyclohexyl 1,4-diisocyanate.

Mention may also be made of arylenedialkylene diisocyanates, such as OCN—$CH_2$—Ø—$CH_2$—NCO.

It is desirable, in the structure of the monomer isocyanate(s), for the portion of the backbone connecting two isocyanate functional groups to comprise at least one polymethylene linkage $(CH_2)\pi$, where $\pi$ represents an integer from two to 10, advantageously from 4 to 8. This preference affects the mechanical performance. When there are several linkages, the latter can be alike or different. In addition, it is desirable for at least one, preferably all, these linkages to be free to rotate and thus exocyclic.

In addition it is preferable, in the blocked polyisocyanate composition, for reasons of crystallinity, for at least 20% of the monomer units of the (poly)condensation product to exhibit a polymethylene linkage $(CH_2)\pi$, as specified above.

When the polyisocyanate composition comprises more than two blocking groups, it is preferable, when one of the agents represents a 5-membered nitrogenous heterocycle, for more than 30 equivalent % of blocking agent(s) comprising an —OH reactive functional group to be present.

Generally, it is preferable to avoid the use of a blocking agent comprising a secondary amine group carrying two aliphatic chains, such as, for example, diisopropylamine.

Blocking agents comprising a nitrogenous heterocycle of aromatic or pseudoaromatic nature, such as pyrazole, triazole, imidazole, tetrazole, pyrazoline, and the like, and generally exhibiting an unsaturation in the ring, do not come within this category.

For the usual uses of isocyanates which are said to be completely blocked, the percentage of residual free isocyanate functional group is preferably at most equal to 5%, advantageously 2%, preferably 1%. The degree of release is quantified by the octanol test (see below).

According to the present invention, the blocked polyisocyanate, pure or as a mixture, results from a polyisocyanate, that is to say having at least two isocyanate functional groups, advantageously more than two (possibilities of fractional values since it is generally a mixture of more or less condensed oligomers), which itself generally results from a precondensation or from a prepolymerization of a diisocyanate unit (sometimes described in the present description as "monomer").

Generally, 90% of the molecules constituting the mixture of these prepolymers or of these precondensates before blocking have an average molecular mass at most equal to approximately 2 000 (Mw), more commonly to approximately 1 000 (Mw), the term approximately meaning that the positional zeros are not significant figures (in other words, the single figure is significant in this case).

Thus, mention may be made, among the polyisocyanates used for the invention, of those of the biuret type and those which, by a di- or trimerization reaction, have resulted in four-, five- or six-membered rings. Mention may be made, among the six-membered rings, of the isocyanuric rings resulting from a homo- or from a heterotrimerization of various diisocyanates alone, with other isocyanate(s) [mono-, di- or polyisocyanate(s)] or with carbon dioxide gas; in this case, a nitrogen of the isocyanuric ring is replaced by an oxygen. Oligomers comprising isocyanuric rings are preferred.

The preferred polyisocyanates are those which exhibit at least one aliphatic isocyanate functional group. In other words, at least one blocked isocyanate functional group according to the invention is connected to the backbone via a carbon of $sp^3$ type advantageously carrying a hydrogen atom, preferably two hydrogen atoms. It is desirable for said carbon of $sp^3$ type to be itself carried by a carbon of $sp^3$ type advantageously equipped with one, preferably with two, hydrogen atoms, in order to avoid the isocyanate functional group under consideration from being in the neopentyl position. In other words, it is advisable to select, as monomers (which generally carry two isocyanate functional groups), at least one compound which carries at least one aliphatic functional group which is neither secondary or tertiary nor neopentyl.

When the composition according to the invention comprises a mixture of isocyanates, it is generally preferable for said mixture to exhibit a mean functionality (number of blocked or nonblocked isocyanate functional groups per molecule comprising them) of greater than 2, advantageously at least equal to 2.1, and at most equal to approximately 15, advantageously to 7, preferably at least equal to 2.4 and at most equal to 4.

The present invention can also be used for latices and in particular latices exhibiting blocked isocyanate functional groups such as disclosed in the European patents of the Applicant Company EP-A-739 961 and EP-A-674 667.

In addition, preference is given to the mixtures of isocyanate compounds in which at least one, advantageously at least two, preferably at least three, of the following conditions are combined:
 at least one third, advantageously two thirds, preferably four fifth, of the free or blocked NCO functional groups are connected to a hydrocarbonaceous backbone via a saturated ($sp^3$) carbon;
 at least one third, advantageously two thirds, preferably four fifth, of said saturated ($sp^3$) carbons carry at least one, advantageously two,
 at least a third, advantageously at least a half, preferably at least two thirds, of said saturated ($sp^3$) carbons are connected to said backbone via a carbon atom itself carrying at least one hydrogen, advantageously two.

The blocked polyisocyanates of the invention are obtained by reacting the polyisocyanates as defined above with the two types of blocking compounds, in particular a blocking compound comprising a reactive hydrogen contributed by an OH functional group and a blocking compound comprising a reactive hydrogen contributed by an NH functional group, successively or simultaneously.

One of the numerous advantages of the new polyisocyanates according to the invention is that they can act as base in the preparation of polymers and/or of crosslinked materials and can be used in particular as one of the main constituents of coatings of all types, such as varnishes and paints. In such uses, the qualities of hardness of the crosslinkable polymers are among those which are sought after at a technical and functional level.

The process for the preparation of polymers comprises the following stages:
 bringing together a blocked polyisocyanate according to the invention and a coreactant which comprises derivatives exhibiting reactive hydrogens in the form of alcohol, of phenol, of thiol or of certain amines, including anilines; these derivatives can have aliphatic, alicyclic or aromatic hydrocarbonaceous backbones, preferably alkyl backbones, including cycloalkyl and aralkyl or aryl backbones, which are linear or branched and substituted or unsubstituted (these coreactants, generally polyols, are known per se);

and heating the reaction mixture thus formed to a temperature which makes possible crosslinking of the components.

Advantageously, the temperature is at most equal to approximately 300° C., preferably between 60 and 250° C. and more preferably still between 100 and 200° C., for a duration of less than or equal to 15 hours, preferably of less than or equal to 10 hours and more preferably still of less than or equal to 8 hours.

It is possible to provide for the inclusion of an organic solvent in the reaction mixture. It is also possible to provide a suspension in water.

This optional solvent is preferably not very polar, that is to say the dielectric constant of which is scarcely greater than or equal to 4 or more preferably greater than or equal to 5.

In accordance with the invention, the preferred solvents which are not very polar are those which are well known to a person skilled in the art and in particular aromatic solvents, such as benzene, ketones, such as cyclohexanone, methyl ethyl ketone and acetone, light alkyl esters and in particular adipic esters, or petroleum fractions of the type of those sold under the trade name Solvesso®.

The derivatives forming part of the composition of the coreactant are generally di-, oligo- or polyfunctional, can be monomers or can result from di-, oligo- or polymerization, and are employed in the preparation of optionally crosslinked polyurethanes; their selection will be dictated by the functionalities expected for the polymer in the final application and by their reactivity.

In particular when it is desired to have stable "two-component" compositions (that is to say, simultaneously comprising the two reactants: the isocyanate, here at least partially blocked according to the invention, and the compound comprising reactive hydrogen), it is preferable to avoid the use of derivatives exhibiting reactive hydrogens which catalyze the release of the blocked isocyanate. Thus, among amines, it is preferable to use only those which do not catalyze the decomposition or the transamidation of the blocked isocyanate functional groups according to the present invention.

These coreactants are generally well known to a person skilled in the art.

The invention thus also relates to paint compositions comprising, for successive or simultaneous addition:

a blocked polyisocyanate according to the invention;

a coreactant comprising reactive hydrogen as described above;

possible catalysts known per se (in particular those based on tin for the oximes);

optionally at least one pigment;

optionally titanium dioxide;

optionally an aqueous phase;

optionally a surface-active agent for maintaining as an emulsion or for keeping in suspension the constituent components of the mixture;

optionally an organic solvent;

optionally a dehydrating agent.

The invention also relates to the paint and varnishes obtained by the use of these compositions, with the optional release according to the above process.

Octanol Test

This is the test which defines the percentage of deblocking at a given temperature, which makes possible classification of the blocking agents.

Definitions

"Release" (or "deblocking") temperature: this is the lowest temperature at "deblocking") which the blocking agent of the temperature blocked isocyanate is 9/10 (mathematically rounded off) displaced by a primary monoalcohol (the primary alcohol is generally octanol).

Shelf life: In order to ensure a good shelf life, it is preferable to choose blocked isocyanate functional groups for which the octanol test shows a "release" at 80° C., advantageously at 90° C., at most equal to 90%.

Progress of the reaction: The reaction is considered to be complete if it is carried out to more than 90%.

In the context of the present invention, the test is carried out at 110° C.

Procedure

Approximately 5 mmol of protected blocked NCO equivalent to be evaluated are charged to a Schott-type tube with magnetic stirring.

2.5 to 3 ml of 1,2-dichlorobenzene (solvent) equivalent of 1-octanol (5 mmol, i.e. 0.61 g, and optionally with the catalyst to be tested with the blocking group) are added.

The reaction mixture is subsequently brought to the test temperature. Heating is then carried out for 6 h at the test temperature, so as to deblock and thus render reactive the isocyanate functional groups. On completion of the reaction, the solvent is removed by vacuum distillation and the residue is analyzed by NMR, mass and infrared.

The percentage of blocked isocyanate functional group condensed with the 1-octanol is evaluated from these data.

In the presence of a catalyst, the deblocking temperatures are lowered, with respect to the values shown, in proportion to the amount of catalyst introduced. The choice of the catalyst can also make it possible to vary the kinetics of deblocking of one of the blocking agents with respect to the other and consequently to vary the kinetics of crosslinking. The choice of the catalyst will be guided by the constraints of the desired application.

The following nonlimiting examples illustrate the invention.

EXAMPLE 1

Preparation of HDT Blocked with 50% MEKO/50% 1,2,4,-triazole.

500 g of HDT (true trimer of HDI), 68 g of MEKO and 53.9 g of 1,2,4-triazole in 140.6 g of AMP (propylene glycol monoethyl ether acetate) are introduced into a 500 ml jacketed reactor. An exothermic reaction takes place. At the end of the latter, the triazole is not completely dissolved.

The reaction mixture is heated with stirring at 80° C. until the triazole has completely dissolved. After one hour at this temperature, 2.7 g of triazole are added and the operation is resumed one hour 30 later. The reaction is allowed to continue for a further one hour. 561.3 g of product are obtained, which product no longer comprises free NCO functional group and exhibits a potential NCO level of 11.56% and a viscosity at 25° C. of 83.3 poises (8330 mPa·s).

D=9.5

(% of deblocking at 110° C.: MEKO: 2) 1,2,4-triazole:19) temperature for the deblocking of 90% of the blocked product: 150° C.

EXAMPLE 2

Preparation of HDT Blocked with 25% MEKO/75% 1,2,4-triazole

The reaction is carried out as for example 1, except that the following reactants are introduced:
HDT: 300 g
1,2,4-triazole: 85.8 g (5% excess)
MEKO: 36 g (5% excess) in AMP: 140.6 g The title product is obtained, which product no longer comprises free NCO functional groups and exhibits a potential NOC level of 11.8%.

D=9.5-
temperature for the deblocking of 90% of the blocked product: 148° C.

This product rapidly crystallizes, which reduces the advantage thereof for the envisage applications.

EXAMPLE 3

Preparation of HDT Blocked with 50% 1,2,4-triazole/ 50% POME

The reaction is carried out as for example 1, except that the following reactants are introduced:
HDT: 259 g
1,2,4-triazole: 49.4 g (5% excess)
POME: 93.7 g (5% excess) in AMP: 134 g The title product is obtained, which product exhibits a few traces of free NCO functional group, a potential NCO level of 10.7% and a viscosity of 72 poises (7200 mPa·s).

D=2.47
(% of deblocking at 110° C.: POME=47)
temperature for the deblocking of 90% of the blocked product: 145° C.

EXAMPLE 4

Preparation of HDT Blocked with 50% MEKO/50% 1,2,4-triazole in the Absence of Solvent.

The reaction is carried out as for example 1, except that the following reactants are introduced into the reactor:
HDT 400 g
1,2,4-triazole: 71.9 g
MEKO: 92.1 g (1.5% excess)

A solid product is obtained, which product is crushed and stored in a freezer.
D=9.5

EXAMPLE 5

Preparation of HDT Blocked with 50% Methyl Amyl Ketoxime/50% 3,5-dimethylpyrazole The following reactant:
HDT: 250 g in Solvesso 100: 133.1 g is introduced, while flushing with argon, into a 1 l round-bottomed flask equipped with a cooling system.

63.9 g of DMP are subsequently added via a funnel. The temperature changes from 20 to 45° C.

85.3 g of MAKO in a dropping funnel are subsequently added. The temperature changes from 45 to 62° C. The mixture is heated to 80° C. and is maintained at this temperature for one hour. The title product is obtained, which product exhibits a potential NCO level of 10.43% and a viscosity of 22.1 poises (2210 mPa·s) at 25° C.

D=7.5
temperature for the deblocking of 90% of the blocked product: 152° C.

EXAMPLE 6

Preparation of HDT Blocked with 50% Methyl Amyl Ketoxime/50% 2-hydroxypyridine

The following reactants:
HDT: 250 g
2-hydroxypyridine: 64.8 g in Solvesso 100: 133.4 g are introduced, while flushing with argon, into a 1 l round-bottomed flask equipped with a cooling system.

The mixture is heated to 80° C. and is maintained at this temperature for one hour. It is cooled to 30° C. The following is added:
MAKO: 85.3 g The mixture is heated at 80° C. for one hour. The title product is obtained with a potential NCO level of 10.4% and a viscosity at 25° C. of 19.7 poises (1970 mPa·s).

D=40
(% of deblocking at 110° C. for 2-OHpyridine 100)
temperature for the deblocking of 90% of the blocked product: 145° C.

EXAMPLE 7

Preparation of HDT Blocked with 50% DMP/50% 2-hydroxypyridine

The reaction is carried out as for example 6, except that DMP (64 g) is introduced in place of the MAKO and the amount of Solvesso 100 is 126.3 g.

The title product is obtained with a potential NCO level of 11.0% and a viscosity at 25° C. of 30.7 poises (3070 mPa·s).

D=6.66
temperature for the deblocking of 90% of the blocked product: 138° C.

EXAMPLE 8

Preparation of HDT Blocked with 80% MAKO/20% DMP

The following:
HDT: 250 g in Solvesso 100: 137.7 g are introduced, while flushing with argon, into a 1 l round-bottomed flask equipped with a cooling system and with a system for regulating the temperature.

The following:
DMP: 26.6 g is added via a funnel and then the following:
MAKO: 136.5 g is added over 15 minutes via a dropping funnel.

The temperature rises from 20 to 73° C. The mixture is heated to 80° C. and is maintained at this temperature for one hour.

The title product is obtained, which product exhibits a potential NCO level of 10.10% and a viscosity at 25° C. of 17.8 poises (1780 mPa·s).

D=6
temperature for the deblocking of 90% of the blocked product: 150° C.

EXAMPLE 9

Preparation of Varnish

Varnishes were prepared based on acrylic polyol (G-Cure 105P 70) with NCO/OH=1.05 and 50% solids content (dilution solvent: EPP/Solvesso 100/RPDE: 57/40/3) with three levels of catalysts:
- without DBTL (dibutyltin dilaurate)
- with 0.05% by weight of DBTL with respect to the dry varnish;
- with 0.5% by weight of DBTL with respect to the dry varnish.

The characteristics of the blocked isocyanates are as follows:

|  | 1 | 2 | 3 | 4 |
|---|---|---|---|---|
| HDI polyisocyanate | Trimer | Trimer | Trimer | Trimer |
| Blocking reactant | MEKO | POME | MEKO/triazole 50/50 | POME/triazole 50/50 |
| SC (%) | 74 | 75 | 75 | 75 |
| Solvent | Solvesso 100 | Butyl acetate | AMP* | AMP* |
| NCO | 11.20 | 9.80 | 11.56 | 10.70 |

*AMP: propylene glycol monoethyl ether acetate

Applications

Each varnish was applied to glass plates (wet 200 μm gauge), left desolvated for 30 minutes at ambient temperature and then stoved for 30 minutes at various temperatures from 110 to 160° C. according to the amount of catalyst.

Twenty-four hours after stoving, the Persoz hardness and the resistance to MEK were measured. The combined analysis of these two measurements makes it possible to determine the deblocking (crosslinking) temperature for curing each of the varnishes for 30 minutes. The results are presented in the table below:

|  | without catalyst (° C.) | with 0.05% DBTL (° C.) | with 0.5% DBTL (° C.) |
|---|---|---|---|
| 1 | 160 | 150 | 140 |
| 2 | 140/150 | 130 | 120 |
| 3 | 150 | 140 | 130 |
| 4 | 140/150 | 130 | 120 |

Thus, it is seen to emerge that:
- for the same curing agent, the change from 0 to 0.05 and then 0.5% of DBTL decreases the blocking temperature by 10° C. and 20° C. respectively;
- the MEKO/triazole mixed blocking makes it possible to decrease the blocking temperature by 10° C. at least with respect to MEKO alone, whatever the level of catalyst;
- the POME/triazole mixed blocking gives identical results to the POME alone blocking. This is consequently advantageous as regards cost.

What is claimed is:

1. A composition comprising aliphatic isocyanates, at least partially blocked by at least two different blocking agents, one of the blocking agents reacting with the isocyanate functional group via an OH group and the other reacting with the isocyanate functional group via an NH group or the at least two blocking agents reacting with the isocyanate functional group via an OH group, the at least two blocking agents having a deblocking temperature of between 80 and 200° C. in the octanol test and being selected so that, in the octanol test at 110° C., the ratio $$D = \frac{\text{percentage in equivalents of blocking agent which deblocks first at } 110°\text{ C.}}{\text{percentage in equivalents of blocking agent which deblocks last at } 110°\text{ C.}}$$

is greater than 4/3, wherein said at least partially blocked aliphatic isocyanates fulfill the following conditions:
- at least one-third of the free or blocked NCO functional groups are connected to a hydrocarbonaceous backbone via a saturated (sp$^3$) carbon;
- at least one-third of said saturated (sp$^3$) carbons carry at least one hydrogen; and
- at least one-third of said saturated (sp$^3$) carbons are connected to said backbone via a carbon atom itself bearing at least one hydrogen, with the proviso that, when a blocking agent comprises a phenol functional group as blocking functional group, it does not comprise a COOH functional group and that, when one of the blocking agents is 1,2,4-triazole, another cannot be methyl ethyl ketoxime, and when the composition comprises more than two blocking functional groups and one of the agents represents a five-membered nitrogenous heterocycle, the composition comprises more than 30 equivalent % of blocking agents reacting with the isocyanate functional group via the OH functional group.

2. A composition comprising isocyanates at least partially blocked, by at least two different blocking agents as defined in claim 1, wherein said ratio D is greater than 1.5.

3. A composition comprising isocyanates at least partially blocked by at least two different blocking agents as defined in claim 1, wherein said ratio D is greater than 2.

4. The composition of claim 1, wherein the ratio of the blocking groups, expressed in equivalents of the blocking functional group, is between 10/90 and 90/10.

5. The composition of claim 1, wherein the ratio of the blocking groups, expressed in equivalents of the blocking functional group, is between 20/80 and 80/20.

6. The composition of claim 1, wherein one of the blocking agents is a substituted or unsubstituted (poly) nitrogenous heterocyclic compound.

7. The composition of claim 1, wherein one of the blocking agents is selected from the group consisting of a pyrazole, a triazole and a pyridine, each being optionally substituted.

8. The composition of claim 7, wherein one of the blocking agents is a triazole, optionally substituted.

9. The composition of claim 1, wherein one of the two blocking agents is an oxime.

10. The composition of claim 1, wherein one of the blocking agents is an oxime selected from the group consisting of methyl ethyl ketoxime, acetone oxime, methyl amyl ketoxime, the oxime of methyl pyruvate and the oxime of ethyl pyruvate.

11. The composition of claim 1, wherein said blocking agents are selected from the pairs:
- triazole other than 1,2,4-triazole/methyl ethyl ketoxime,
- triazole/oxime of ethyl pyruvate,
- dimethylpyrazole/methyl amyl ketoxime,
- hydroxypyridine/methyl amyl ketoxime, and
- dimethylpyrazole/hydroxypyridine.

12. The composition of claim 1, comprising a mixture of compounds bearing blocked isocyanate functional group(s), wherein said compounds exhibit a mean functionality (number of blocked or nonblocked isocyanate functional groups per molecule comprising them) of greater than 2, and at most equal to about 15.

13. The composition of claim 1, comprising a mixture of compounds bearing blocked isocyanate functional group(s), wherein said compounds exhibit a mean functionality (number of blocked or nonblocked isocyanate functional groups per molecule comprising them) at least equal to 2.1, and at most equal to 4.

14. The composition of claim 1, comprising a mixture of compound bearing blocked isocyanate functional group(s) wherein said compounds exhibit a mean functionality (number of blocked or nonblocked isocyanate functional group per molecule comprising them) at least equal to 2.4 and at most equal to 7.

15. The composition according to claim 1, wherein two blocking agents are used and one is a substituted 5-membered ring nitrogenous heterocycle, and the sum in equivalents of the carbon atoms of the substituent groups with regard to the nitrogenous rings is at least equal to 6.

16. A kit for the preparation of a coating, comprising, a composition of claim 1 and a coreactant comprising a reactive hydrogen.

17. The kit of claim 16, for the preparation of a paint.

18. A process for the preparation of coating polymers, comprising the following steps:
bringing together the composition of claim 1 and a coreactant which comprises derivatives exhibiting reactive hydrogens; and
heating the reaction mixture thus formed to a temperature which allows crosslinking of the isocyanate groups of compounds with said coreactant.

19. A process for the preparation of a composition, comprising the step of reacting an aliphatic (poly)isocyanate composition, successively or simultaneously, with at least two different blocking agents, one of the blocking agents reacting with the isocyanate functional group via an OH group and the other reacting with the isocyanate functional group via an NH group or the at least two blocking agents reacting with the isocyanate functional group via an OH group, the at least two blocking agents having a deblocking temperature of between 80 and 200° C. in the octanol test and being selected so that, in the octanol test at 110° C., the ratio $$D = \frac{\text{percentage in equivalents of blocking agent which deblocks first at } 110° \text{ C.}}{\text{percentage in equivalents of blocking agent which deblocks last at } 110° \text{ C.}}$$

is greater than 1/3, wherein the following conditions are fulfilled:
at least one-third of the free or blocked NCO functional groups are connected to a hydrocarbonaceous backbone via a saturated ($sp^3$) carbon;
at least one-third of said saturated ($sp^3$) carbons carry at least one hydrogen; and
at least one-third of said saturated ($sp^3$) carbons are connected to said backbone via a carbon atom itself bearing at least one hydrogen, with the proviso that, when a blocking agent comprises a phenol functional group as blocking functional group, it does not comprise a COOH functional group and that, when one of the blocking agents is 1,2,4-triazole, another cannot be methyl ethyl ketoxime, and when the polyisocyanate composition comprises more than two blocking functional groups and one of the agents represents a five-membered nitrogenous heterocycle, the composition comprises more than 30 equivalent % of blocking agents reacting with the isocyanate functional group via the OH functional group.

20. The process according to claim 19, wherein two blocking agents are used and one is a substituted 5-membered ring nitrogenous heterocycle, and the sum in equivalents of the carbon atoms of the substituent groups with regard to the nitrogenous rings is at least equal to 6.

* * * * *